United States Patent [19]

Jennings

[11] 4,435,948
[45] Mar. 13, 1984

[54] MECHANISM FOR PIVOTING WINDROW SHIELDS INTO A VERTICAL TRANSPORT POSITION

[75] Inventor: Richard E. Jennings, New Holland, Pa.

[73] Assignee: Sperry Corporation, New Holland, Pa.

[21] Appl. No.: 431,520

[22] Filed: Sep. 30, 1982

[51] Int. Cl.³ .............................................. A01B 73/00
[52] U.S. Cl. ........................................ 56/228; 56/192
[58] Field of Search .................... 56/228, 208, 192; 280/415 R, 43.23, 415 B; 172/625, 240, 241, 172/248

[56] References Cited

U.S. PATENT DOCUMENTS

| | | | |
|---|---|---|---|
| 3,059,403 | 9/1962 | Bamford et al. | 56/192 |
| 3,221,484 | 12/1965 | Van Der Lely | 56/192 |
| 3,751,891 | 8/1973 | Molzahn | 56/228 |
| 3,962,853 | 6/1976 | Schwalm | 56/228 |

Primary Examiner—Gene Mancene
Assistant Examiner—John G. Weiss

Attorney, Agent, or Firm—Larry W. Miller; Frank A. Seemar; Darrell F. Marquette

[57] ABSTRACT

A mechanism for pivotally moving the windrow forming shield on a crop harvesting machine from a generally horizontally extending operative position to a generally vertically extending transport position is disclosed wherein the pivotal movement of the frame relative to a pivotal axis carried by the draft member effects a pivotal movement of the windrow forming shield. A first sprocket is stationarily fixed to the draft member while a second sprocket orbits about the first sprocket as a result of the frame being pivotally moved about its pivot axis. An endless chain entrained around both the first and second sprockets effects a rotation of the second sprocket during its orbital movement around the first sprocket to cause a rotation of a connected pivot shaft and effect a pivotal movement of the windrow shield. By making the second sprocket half the size of the first sprocket, the windrow forming shield can be moved through 180 degrees of movement while the frame is being rotated 90 degrees.

10 Claims, 5 Drawing Figures

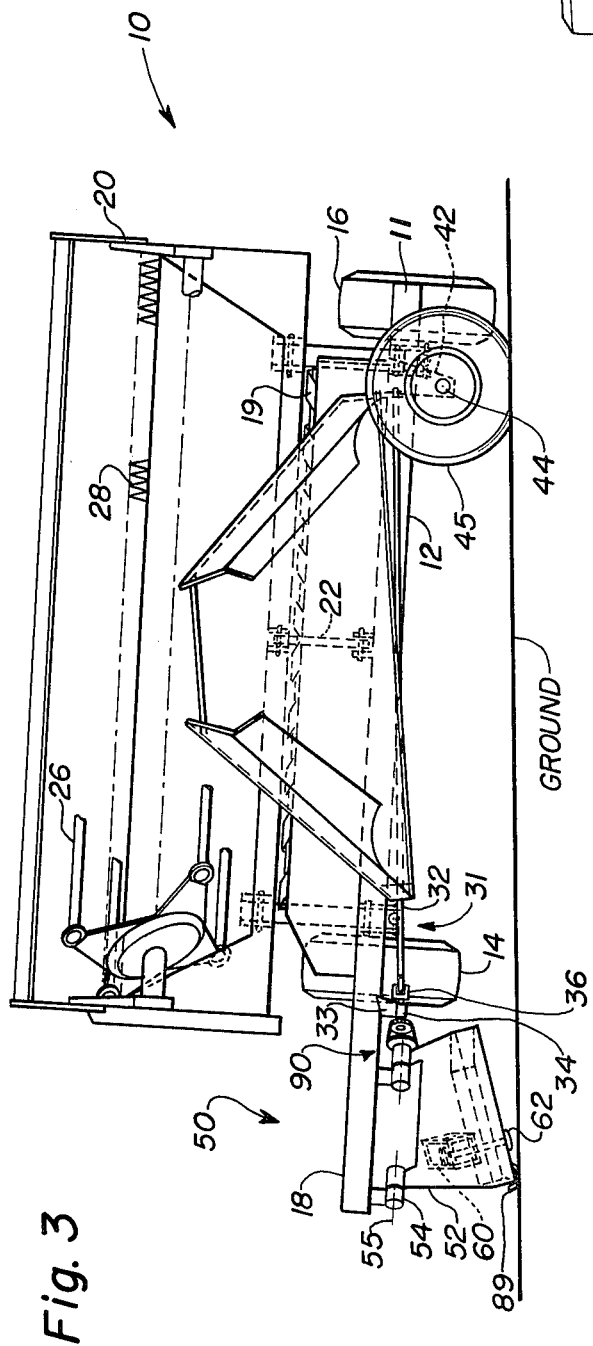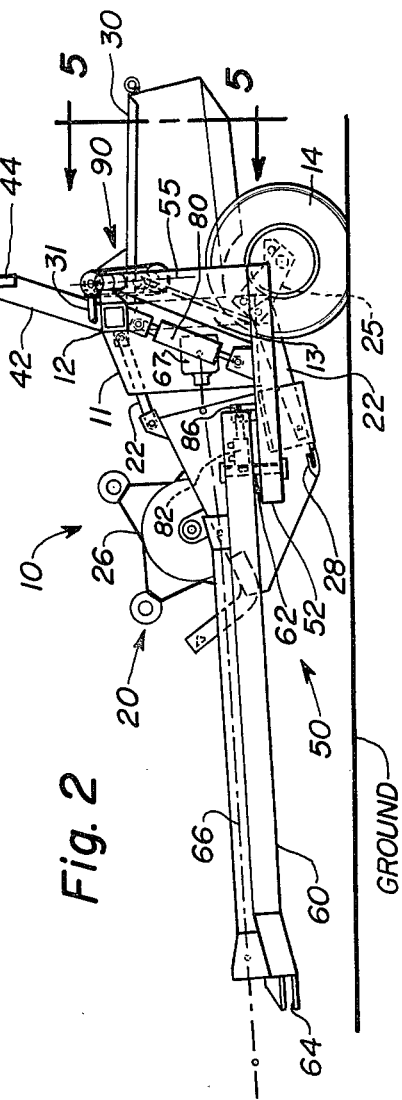

MECHANISM FOR PIVOTING WINDROW SHIELDS INTO A VERTICAL TRANSPORT POSITION

BACKGROUND OF THE INVENTION

The present invention relates generally to crop harvesting machines and, more particularly, to a mechanism for automatically pivotally moving a windrow forming shield from a horizontally extending operative position to a vertically extending transport position to minimize the transport width of a laterally transported mower-conditioner.

The conversion of a crop harvesting machine from a longitudinally movable harvesting position to a laterally movable transport position is desirable for large width machines to minimize the transport width of the harvester. By rotatably pivoting the frame about a pivot axis carried by the draft member the crop harvesting header can be pivotally moved from a generally horizontally extending operative position adjacent the ground to a generally vertically extending transport position to further minimize the lateral transport width of the harvester.

Since the windrow forming shields also project outwardly in a generally horizontal direction, a pivotal movement of the windrow forming shields to a generally vertically extending position would further minimize the lateral transport width of the harvester. Accordingly, it would be desirable to provide a mechanism that would automatically pivotally move the windrow shields in a direction opposite to the rotational movement of the header so that both components can be positioned in a generally vertically extending manner substantially parallel to one another.

SUMMARY OF THE INVENTION

It is object of this invention to overcome the aforementioned disadvantages of the prior art by providing a mechanism for automatically pivotally removing the windrow forming shield on a mower-conditioner to a vertically extending transport position while the header is being pivotally moved into a similar vertically extending position.

It is another object of this invention to utilize the orbital movement of the harvester frame about a pivot axis to effect a pivotal movement of the windrow shields into a generally vertical position.

It is a feature of this invention that the windrow forming shields are pivotally moved in a direction opposite to the direction of movement of the header during the pivotal movement of the harvester frame about its pivot axis.

It is an advantage of this invention that the overall transport width of the crop harvesting machine is optimally reduced.

It is another advantage of this invention that the axis of rotation of the windrow forming shield is askewed to the line of the harvester frame to provide maximum ground clearance when the harvester is fully in the lateral transport position.

It is still another object of this invention to provide a mechanism for pivotally moving the windrow forming shields to obtain approximately 180 degrees of pivotal movement from approximately 90 degrees of pivotal movement of the harvester frame.

It is another feature of this invention that the windrow forming shield on a mower-conditioner is moved into a vertically extending position generally parallel to the rotated position of the crop harvesting header.

It is a further object of this invention to provide a mechanism for pivotally moving the windrow forming shield on a crop harvesting machine from a generally horizontally extending operative position to a generally vertically extending transport position which is durable of construction, inexpensive of manufacture, carefree of maintenance, facile in assemblage and simple and effective in use.

These and other objects, features and advantages are accomplished according to the present invention by providing a mechanism for pivotally moving the windrow forming shield on a crop harvesting machine from a generally horizontally extending operative position to a generally vertically extending transport position wherein the pivotal movement of the frame relative to a pivotal axis carried by the draft member effects a pivotal movement of the windrow forming shield. A first sprocket is stationarily fixed to the draft member while a second sprocket orbits about the first sprocket as a result of the frame being pivotally moved about its pivot axis. An endless chain entrained around both the first and second sprockets effects a rotation of the second sprocket during its orbital movement around the first sprocket to cause a rotation of a connected pivot shaft and effect a pivotal movement of the windrow shield. By making the second sprocket half the size of the first sprocket, the windrow forming shield can be moved through 180 degrees of movement while the frame is being 90 degrees.

BRIEF DESCRIPTION OF THE DRAWINGS

The advantages of this invention will become apparent upon a consideration of the following detailed disclosure of the invention, especially when taken in conjunction with the accompanying drawings wherein:

FIG. 2 is a side elevational view of the crop harvesting machine seen in FIG. 1 in the operating mode;

FIG. 3 is a rear view of the crop harvesting machine seen in FIG. 1 at a position intermediate the operating and lateral transport positions, the frame, header, and windrow shields having been pivotally moved into a vertically extending transport position, while the one normal operating wheel has not yet been rotated into a laterally oriented transport position;

DETAILED DESCRIPTION OF THE PREFERRED EMBODIMENT

Figure 1:
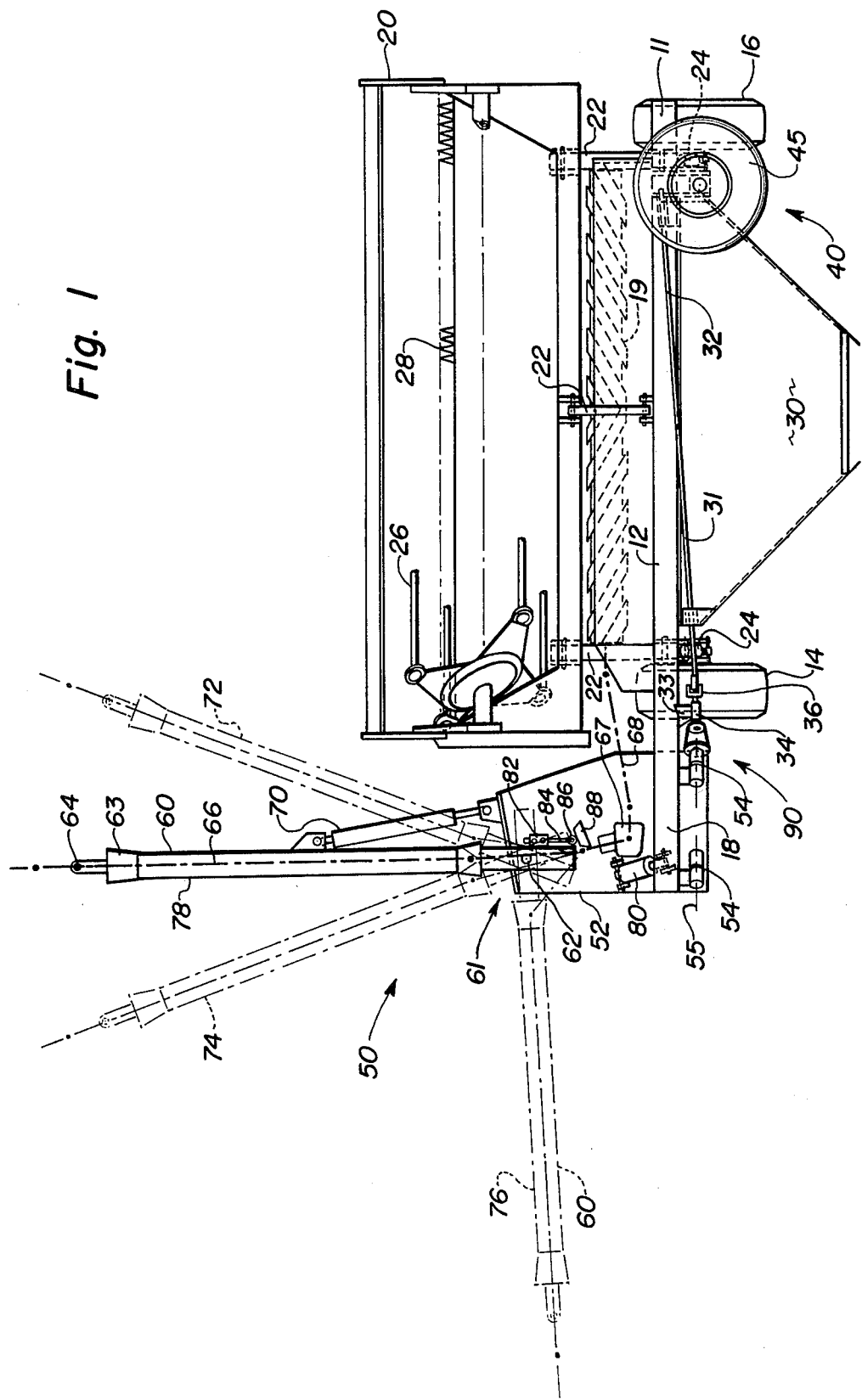
FIG. 1 is a top plan view of a crop harvesting machine, commonly referred to as a mower-conditioner, incorporating the principles of the instant invention, the machine being shown in the operating mode with the pivotal movement of the tongue being shown in phantom.

Referring now to the drawings and, particularly, to FIG. 1, a top plan view of a crop harvesting machine, commonly referred to as a mower-conditioner, can be seen. The crop harvesting machine 10 includes a frame 11 having an upper elongated beam 12 and downwardly depending legs 13 to which wheel arms 25 are pivotally connected for rotatably mounting left and right ground engaging operating wheels 14,16. The upper beam 12 also includes an upper beam extension 18 which projects leftwardly beyond the left wheel 14. A pair of conditioning rolls 19 are rotatably mounted in the frame 11 to condition severed crop material fed thereto.

A header 20 is mounted forwardly of the frame 11 by a set of header lift links 22 to floatingly support the header 20 through a conventional spring flotation system, not shown. A pair of header lift cylinders 24 interconnecting the wheel arms 25 and the downwardly depending legs 13 permit a lifting of the frame 11 and the header 20 relative to the ground, as is well known in the art. The header 20 includes a reel 26 mounted above a normally generally horizontally extending cutterbar 28 which severs standing crop material to be fed rearwardly into the conditioning rolls 19 by the reel 26 in a conventional manner.

A windrow forming shield 30 is affixed to a generally transverse shaft assembly 31 rotatably mounted by brackets 33 affixed to the upper beam 12 of the frame 11. The shaft assembly 31 includes a main shaft member 32 disposed in an askewed position relative to the upper beam 12 and a stub shaft 34 which is connected to the main shaft member 32 by universal joint 36 because of the misalignment between the main shaft 32 and the stub shaft for reasons that are further detailed below.

Referring now to FIGS. 1 and 2, a transport wheel assembly 40 is best seen. The wheel assembly 40 includes an upwardly extending tower post 42 affixed to the upper beam 12 of the frame 11. A spindle 44 is connected to the tower post 42 to rotatably mount a transport wheel 45 which, in the operating position as seen in FIGS. 1 and 2, is disposed in a generally horizontal orientation above the upper beam 12.

The draft mechanism 50 includes a hitch base member 52 and an elongated tongue 60. The hitch base member 52 is pivotally connected to the upper beam extension 18 by a pair of pivot pins 54 defining a pivot axis 55 that is inclined downwardly to the right. The tongue 60 is pivotally connected at one end to the hitch base member 52 by a generally vertical pivot 62. The tongue is adapted at the opposing end 63 with a hitching mechanism 64 for connection to a prime mover, such as a tractor (not shown). Rotational power is provided by a conventional power takeoff drive line schematically indicated by the broken line 66 into a 90 degree gearbox 67 having an output driveline indicated by the broken line 68 to the conditioner rolls 19. The drives to the reel 26 and cutterbar 28 have been omitted for reasons of clarity, but are conventional and well known in the art.

A hydraulic cylinder 70, connected to a hydraulic circuit separate from the hydraulic circuit operatively powering the header lift cylinders 24, interconnects the tongue 60 and the hitch base member 52 to operably power a pivotal movement of the tongue 60 relative to the hitch base member 52. Selective manipulation of the length of the hydraulic cylinder 70 is operable to pivotally move the tongue 60 from a field transport position 72 to a field operating position 74 and to a laterally extending transport position 76, all of which are shown in phantom in FIG. 1. As is seen in solid lines in FIG. 1, a preselected actuated position 78 for the tongue 60 is intermediate of the field transport position 72 and the field operating position 74.

As is seen in both FIGS. 1 and 2, a second hydraulic cylinder 80 interconnects the base hitch member 52 and the upper beam extension 18 of the frame 11. The second hydraulic cylinder 80 is operable to pivotally rotate the frame 11 about the pivotal axis 55 defined by the pivot pins 54 carried by the hitch base member 52. The second hydraulic cylinder 80 is operably powered by the same hydraulic circuit as the header lift cylinders 24. Included in this hydraulic circuit is a cam actuated selector valve 82 having a shiftable spool 84 operable to divert the fluid in this hydraulic circuit to either the header lift cylinders 24 or the second hydraulic cylinder 80.

The valve spool 84 is spring loaded into a position that diverts the fluid to the header lift cylinders 24; however, when the tongue 60 is positioned in the intermediate actuation position 78, a roller 86 affixed to the valve spool 84 engages a cam 88 to overcome the spring force and move the valve spool 84 into a second position that diverts the fluid in the hydraulic circuit from the header lift cylinders 24 into the second hydraulic cylinder 80. It should be realized by one skilled in the art that the provision of the selector valve 82 permits the instant invention to be utilized with a tractor having dual hydraulic circuits.

Referring now to FIGS. 1, 2, 3 and 4, the operation of the apparatus for converting the crop harvesting machine 10 from a harvesting mode to a lateral transport mode can be seen. Once the tongue 60 has been positioned in the intermediate actuation position 78, thereby activating the cam controlled selector valve 82 to divert the flow of fluid in the corresponding hydraulic circuit to the second hydraulic cylinder 80, the crop harvesting machine 10 can be converted into its lateral transport position.

An extension of the length of the hydraulic cylinder 80 affects a pivotal movement of the frame 11 about the pivot axis 55. As a result, the header 20, which rotatably moves along with the frame 11, is rotated from the generally horizontally extending position seen in FIGS. 1 and 2 to the generally vertical extending position seen in FIGS. 3 and 4. The rotation of the frame 11 about the pivot axis 55 by approximately 90 degrees also affects a rotation of the transport wheel assembly 40 from the upwardly extending position seen in FIG. 2 to the ground engaging position seen in FIG. 3.

Because the pivot axis 55 is inclined to a horizontal plane passing through the hitch base member 52, the left wheel 14 becomes elevated above the ground while the right wheel 16 remains engaged with the ground until the transport wheel 45 moves into its ground engaging position. Since the connection with the prime mover (not shown) at the hitching mechanism 64 is generally flexible, the hitch base member 52 ultimately contacts the ground, with the skid plate 89 actually engaging the ground surface, as the left wheel 14 is elevated.

Figure 4:
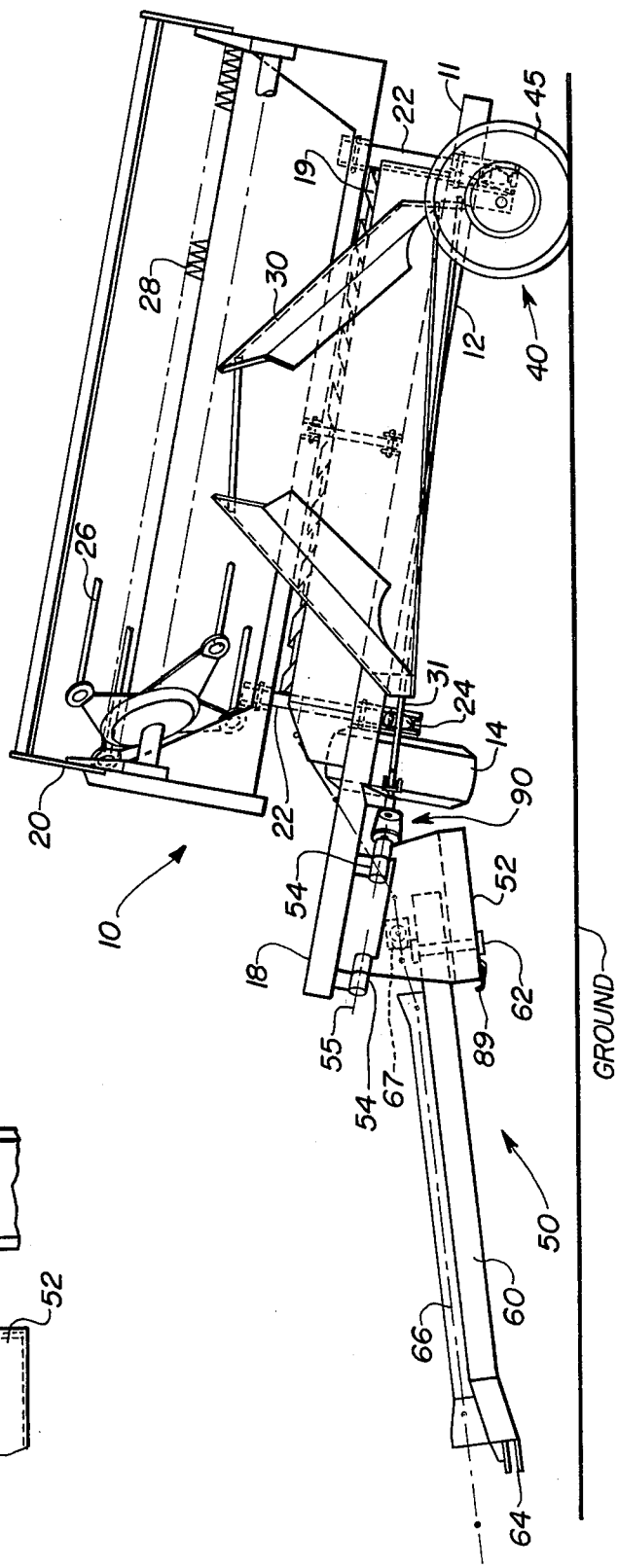
FIG. 4 is a rear elevational view of the crop harvesting machine seen in FIG. 1 fully in the lateral transport position, with the tongue being swung into a laterally extending position.

An extension of the second hydraulic cylinder 80 beyond that necessary to rotate the frame 11 to move the transport wheel 45 into a ground engaging position causes the right wheel 16 to also lift off the ground. The right wheel 16 is pivotally connected so that it is movable from a longitudinal oriented position, as seen in FIG. 3, to a laterally oriented position, as seen in FIG. 4. The elevating of the right wheel 16 off the ground facilitates this pivotal movement of the wheel 16. A slight shortening of the length of the second hydraulic cylinder 80 will reengage the right wheel 16 with the ground surface to assist the transport wheel 45 in mobilely supporting the crop harvesting machine 19 while in the lateral transport mode. Although not shown in the drawings, one skilled in the art will readily realize that power means, such as another hydraulic cylinder or an electric motor, can be provided to automatically pivot the wheel 16 into its transport position.

Figure 5:
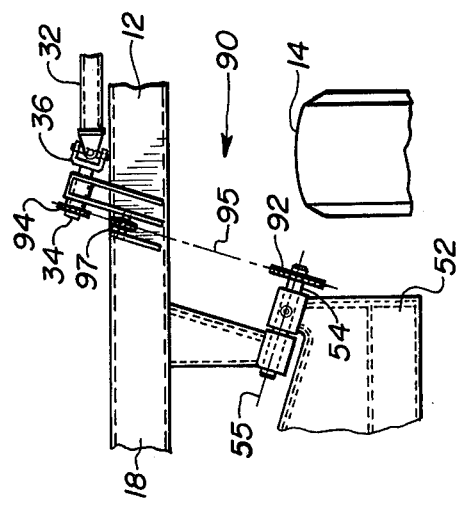
FIG. 5 is an enlarged detailed view taken along lines 5—5 of FIG. 2 to show the rear view of the mechanism for pivoting the windrow shields into a vertically extending transport position.

Referring now to FIGS. 1-5, with particular emphasis on FIG. 5, the mechanism for pivotally moving the windrow forming shield 30 can be seen. It should be noted that provision for pivotally moving the windrow forming shield 30 must be made or the shield 30 will impact the ground when the frame 11 is pivotally rotated about the pivot axis 55. The automatic pivoting mechanism 90 includes a first sprocket 92 affixed to one of the pivot pins 54 so as to be stationary during the pivotal movement of the frame 11 about the pivot axis 55. A second sprocket 94 is affixed to the stub shaft 34 to be rotatable therewith. To keep the first and second sprockets 92,94 in the same plane, the stub shaft 34 is mounted parallel to the pivot axis 55. An endless flexible chain 95 is entrained around both the first and second sprockets 92 and 94.

Since the first sprocket 92 is coaxially mounted with the pivot axis 55, the second sprocket 94 orbits about the first sprocket 92 as the frame 11 pivotally moves about the pivot axis 55. Since the first sprocket 92 is stationarily fixed and cannot rotate, the chain 95 walks around the first sprocket 92 as the second sprocket 94 orbits thereabout. As a result, the second sprocket 94 will rotate, thereby rotating the shaft assembly 31, as the second sprocket 94 orbits about the first sprocket 92, causing the windrow forming shield 30 to pivotally move relative to the frame 11 opposite to the rotation of the frame 11 about the pivot axis 55. As can be best seen in FIG. 4, the shaft member 32 is askewed relative to the beam 12 and the stub shaft 34 to assure sufficient clearance of the windrow forming shield 30 when fully in the transport position.

By providing a second sprocket 94 that is half the size of the first sprocket 92, the second sprocket 94 will rotate twice as fast as the sprocket 94 is orbited about the first sprocket 92. Under this configuration, the windrow forming shield 30 will be pivotally moved approximately 180 degrees relative to the frame 11 during 90 degrees of rotation of the frame 11 about the pivot axis 55, resulting in the windrow forming shields rotating oppositely of the frame 11 and being positioned in a generally vertically oriented position substantially parallel to the vertically extending position of the header 20. One skilled in the art will readily realize that equivalent components can be substituted for the first and second sprockets 92,94 and the chain 95, such as pulleys or a reel takeup mechanism utilizing a flexible cable. In addition, an idler sprocket 97 can be provided for engagement with the chain 95 to takeup any excess slack therein.

Once the second hydraulic cylinder 80 has been extended to the proper length to cause the header 20 and the windrow forming shields 30 to be moved into a generally vertically extending position and to cause the transport wheel 45 to engage the ground surface and after the right wheel 16 has been moved into a laterally oriented position, the first hydraulic cylinder 70 can be actuated to effect a pivotal movement of the tongue 60 to the laterally extending transport position 76, as seen in FIGS. 1 and 4. It should be noted that, once the tongue 60 has moved from the intermediate actuation position 78, the roller 86 will disengage from the cam 88 and the spring loaded valve spool 84 will return to the first position in which the flow of fluid is diverted from the second hydraulic cylinder 80 to the hydraulic life cylinders 24, thereby locking the second hydraulic cylinder 80 into the selected lengthened position. Obviously, additional mechanical lockouts can be provided to assure that the second hydraulic cylinder remains in the selected position.

During the pivotal movement of the tongue 60 into its laterally extending transport position 76 from the intermediate actuation position 78, the hitch base member 52 becomes elevated from the ground to the position seen in FIG. 4. The elevation of the hitch base member 52 off the ground results by the pivotal movement of the tongue 60 about the vertical pivot 62 results because the height of the hitch mechanism, which is connected to the prime mover, and the height of the rear transport wheels 45,16 remains constant while the distance between them increases.

It should be noted that when the machine 10 is in the lateral transport position with the header 20 and the windrow forming shield 30 tilted upwardly, the heavy components of the machine 10, such as the upper beam 12 and the conditioning rolls 19, are located relatively closely to the ground, resulting in a relatively low center of gravity, which provides for a stable transport of the machine 10. The parts of the machine 10 extended upwardly into the air, such as sheet metal shielding and the reel 26, are relatively light in comparison.

It will be readily realized by one skilled in the art that the principles of the instant invention as described above in the preferred embodiment may be utilized in other agricultural machines without departing from the scope of the invention. It will be understood that various changes in the details, materials, steps and arrangements of parts which have been described and illustrated to explain the nature of the invention, will occur and may be made by those skilled in the art upon a reading of the disclosure within the principles and scope of the invention. The foregoing descrition illustrates preferred embodiments of the invention. However, concepts, as based upon such a description, may be employed in other embodiments without departing from the scope of the invention. Accordingly, the following claims are intended to protect the invention broadly, as well as in the specific form shown herein.

Having thus described the invention, what is claimed is:

1. In a crop harvesting machine convertable between a longitudinally movable operating position and a laterally movable transport position and having a draft means for connection to a prime mover for a source of motive power, said draft means including a hitch base member and a tongue pivotally connected to said hitch base member; a frame pivotally connected to said hitch base member for rotation about a pivot axis; windrow shields pivotally mounted on said frame for movement between a generally horizontally extending operative position and a generally vertically extending transport position; and power means for pivotally moving said frame and said tongue, the improvement comprising:

windrow shield pivot means interconnecting said hitch base member and said frame to automatically pivotally rotate said windrow forming shield from said operative position to said transport position as said frame is pivotally moved about said pivot axis.

2. The crop harvesting machine of claim 1 wherein said windrow forming shield is affixed to a transversely extending shaft assembly rotatably mounted to said frame, said shaft assembly defining an axis of rotation for the pivotal movement of said windrow forming shields.

3. The crop harvesting machine of claim 2 wherein said windrow shield pivot means comprises:
   a shaft member rotatably supported by said frame and affixed to said windrow shields for pivotally moving said windrow shields relative to said frame;
   a first member stationarily affixed to said hitch base member;
   a second member affixed to said shaft and rotatable therewith; and
   a flexible member engaged with said first member to wrap around said first member and with said second member to cause rotation of said second member as said frame rotates about said pivot axis.

4. The crop harvesting machine of claim 3 wherein said flexible member is engaged with said first and second members such that said second member is rotated in a direction opposite to the direction of rotation of said frame about said pivot axis, the rotation of said second member effecting a rotation of said shaft member and resulting in the pivotal movement of said windrow shields.

5. The crop harvesting machine of claim 4 wherein said first and second members are sprockets and said flexible member is en endless chain entrained around said sprockets.

6. The crop harvesting machine of claim 5 wherein said second sprocket is half the size of said first sprocket so that the pivotal movement of said windrow shields will be twice as fast as the pivotal movement of said frame about said pivot axis.

7. The crop harvesting machine of claim 6 wherein said shaft member defines an axis of rotation that is not disposed parallel to said pivot axis.

8. The crop harvesting machine of claim 7 wherein said shaft member is askewed with respect to said frame.

9. The crop harvesting machine of claim 8 wherein said second sprocket is affixed to a stub shaft, said stub shaft being connected to said shaft member by a universal joint to accommodate a misalignment between said axis of rotation and said stub shaft.

10. The crop harvesting machine of claim 9 wherein said pivot axis is defined by a pair of pivot pins, said first sprocket being affixed to one of said pivot pins, said stub shaft being oriented substantially parallel to said pivot axis so that said first and second sprockets are disposed in a common plane.

* * * * *